United States Patent
Brunner et al.

(10) Patent No.: US 7,330,192 B2
(45) Date of Patent: *Feb. 12, 2008

(54) RENDERING TRANSLUCENT LAYERS IN A DISPLAY SYSTEM

(75) Inventors: Ralph T. Brunner, Santa Clara, CA (US); Peter Graffagnino, San Francisco, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/503,394

(22) Filed: Aug. 11, 2006

(65) Prior Publication Data

US 2007/0040851 A1   Feb. 22, 2007

Related U.S. Application Data

(63) Continuation of application No. 10/017,674, filed on Dec. 14, 2001, now Pat. No. 7,106,275, which is a continuation of application No. 09/309,171, filed on May 10, 1999, now Pat. No. 6,369,830.

(51) Int. Cl.
   G09G 5/02   (2006.01)
(52) U.S. Cl. ........................................ 345/592; 345/32
(58) Field of Classification Search ................. 345/32, 345/592
   See application file for complete search history.

(56) References Cited

U.S. PATENT DOCUMENTS

| | | | |
|---|---|---|---|
| 4,769,636 A | 9/1988 | Iwami et al. | |
| 4,780,709 A | 10/1988 | Randall | |
| 5,428,724 A | 6/1995 | Silverbrook | |
| 5,499,327 A | 3/1996 | Satoh | |
| 5,509,110 A | 4/1996 | Latham | |
| 5,594,467 A | 1/1997 | Marlton et al. | |
| 5,638,499 A * | 6/1997 | O'Connor et al. | 345/630 |
| 5,831,628 A | 11/1998 | Shimizu | |
| 5,877,762 A | 3/1999 | Young | |
| 5,889,527 A | 3/1999 | Tsai | |
| 5,923,333 A | 7/1999 | Stroyan | |
| 6,028,583 A * | 2/2000 | Hamburg | 345/629 |
| 6,049,339 A * | 4/2000 | Schiller et al. | 345/630 |
| 6,072,501 A * | 6/2000 | Bier | 345/629 |

(Continued)

FOREIGN PATENT DOCUMENTS

EP   0 775 971   5/1997

OTHER PUBLICATIONS

Blinn, J. F., "A Ghost in a Snowstorm," IEEE Computer Graphics and Applications, Jan./Feb. 1998, pp. 79-89.

(Continued)

Primary Examiner—Kee M. Tung
Assistant Examiner—Michelle K Lay
(74) Attorney, Agent, or Firm—Fenwick & West LLP

(57) ABSTRACT

A system and method of rendering overlapping layers in a computer display, such as a windowing system, employs front-to-back assembly of the displayed image. An arbitrary number of overlapping elements, such as windows, can be presented, without requiring temporary storage space or additional off-screen buffers. The front-to-back assembly technique minimizes the number of memory transfers performed in connection with rendering an image, and avoids unnecessary reading and processing of pixels that will not contribute to the final image. Special effects such as semi-transparency, shadows, and irregular shapes can be accommodated and processed in an efficient manner.

56 Claims, 9 Drawing Sheets

U.S. PATENT DOCUMENTS 6,515,675 B1     2/2003    Bourdev
6,803,923 B1    10/2004    Hamburg

OTHER PUBLICATIONS

Blinn, J. F., "Three Wrongs Make a Right," IEEE Computer Graphics and Applications, Nov. 1995, pp. 90-93.

Blinn, J. F., "Composting, Part 2: Practice," IEEE Computer Graphics and Applications, Nov. 1994, pp. 78-82.

Blinn, J. F., "Composting, Part 1: Theory," IEEE Computer Graphics and Applications, Sep. 1994, pp. 83-87.

Porter, et al., "Compositing Digital Images," Computer Graphics, Jul. 1984, pp. 49-55, vol. 18, No. 3.

* cited by examiner

RENDERING TRANSLUCENT LAYERS IN A DISPLAY SYSTEM

CROSS REFERENCE TO RELATED APPLICATIONS

This application is a continuation of U.S. patent application Ser. No. 10/017,674, filed on Dec. 14, 2001 now U.S. Pat. No. 7,106,275, which is a continuation of U.S. patent application Ser. No. 09/309,171, filed on May 10, 1999, now U.S. Pat. No. 6,369,830, the disclosure of which is hereby incorporated by reference.

BACKGROUND OF THE INVENTION

1. Field of the Invention

The present invention relates generally to computer-implemented display systems, and more particularly to a system and method of rendering translucent and complex-shaped overlapping layers in a display system.

2. Description of Background Art

Many existing display systems are capable of compositing two or more display elements to generate a final image. In such systems, display elements often include overlapping layers, such as for example in a windowing system for a graphical user interface wherein on-screen elements, such as windows, may be moved around and placed on top of one another.

Rendering and displaying an image having two or more overlapping layers presents certain problems, particularly in determining how to render that portion of the image where the layers overlap. When the overlapping layers are opaque, the graphics system need only determine which layer is on "top", and display the relevant portion of that layer in the final image; portions of underlying layers that are obscured may be ignored. However, when overlapping layers are translucent, more complex processing may be called for, as some interaction among picture elements (pixels) in each overlapping layer may take place. Accordingly, some calculation may be required to overlay the image elements in order to derive a final image.

Compositing techniques for performing these calculations are known in the art. See, for example, T. Porter et al., in "Compositing Digital Images", in *Proceedings of SIGGRAPH '84*, 1984, pp. 253-59. Generally, however, such techniques are directed toward compositing only two layers at a time. When more than two layers are to be composited, a number of separate operations must be performed in order to generate the final image. This is generally accomplished by compositing image elements in a bottom-up approach, successively combining each new layer with the results of the compositing operations performed for the layers below.

This step-by-step compositing approach has several disadvantages. If the image is constructed in the frame buffer, on-screen flicker may result as the system writes to the frame buffer several times in succession. Alternatively, the image may be constructed in an off-screen buffer, thus avoiding on-screen flicker; however, such a technique requires additional memory to be allocated for the buffer, and also requires additional memory reads and writes as the final image is transferred to the frame buffer.

In addition, step-by-step generation of the final image may result in poor performance due to the large number of arithmetic operations that must be performed. Writing date to a frame buffer is particularly slow on many computers; therefore, conventional systems which write several layers to the frame buffer in succession face a particularly severe performance penalty.

Finally, such a technique often results in unnecessary generation of some portions of image elements that may later be obscured by other image elements.

Conventionally, arbitrarily shaped windows and layers are accomplished by dividing a window into rectangular areas and/or blocking out some portions of a rectangle to make a rectangular layer appear to be arbitrarily shaped. Such techniques often result in additional processing time for areas of the windows that may have no effect on the final image.

What is needed is a system and method for rendering translucent layers, which avoids the above-referenced deficiencies and allows compositing of multiple layers without causing screen flicker and without requiring additional off-screen buffers. What is further needed is a rendering system and method that improves the performance of prior art systems when generating images having multiple overlapping translucent layers. What is further needed is a rendering system and method that avoids unnecessary generation of image element portions that will be obscured by other image elements in the final image.

SUMMARY OF THE INVENTION

In accordance with the present invention, there is provided a rendering system and method that facilitates efficient compositing of translucent and complex-shaped overlapping layers. An alpha channel is provided for each layer, in order to allow transparency characteristics to be specified on a pixel-by-pixel basis within the layer. Rendering is performed in front-to-back sequence, so that the invention is able to avoid unnecessary computations on layer portions that do not contribute to the final image. In addition, in one embodiment, compositing is made more efficient by first subdividing the image area into rectangles, wherein the set of overlapping layers (and their ordering) for all points within a given rectangle is constant. Compositing operations can then be performed on each rectangle separately, so as to avoid complex and time-consuming bounds-checking operations inside the innermost loop of the processing operation.

The present invention renders two or more overlapping layers, each having an alpha channel, into a destination bitmap. The destination bitmap may be the frame buffer of a video system, for example. For each pixel in the destination bitmap, the present invention processes the layers having a corresponding pixel in front-to-back sequence, accumulating color and alpha values. Once the accumulated alpha channel reaches full opacity, the present invention stops working on that pixel; any pixels lying beneath the stopping point would be completely obscured (since full opacity has been reached) and need not be processed.

The present invention thus avoids reading pixel data that corresponds to pixels that do not contribute to the final image. This economy in image processing results in improved performance of the graphics system. In addition, if the destination bitmap is the frame buffer, flickering effects are reduced because each pixel in the destination bitmap is written at most once. The present invention also enables easy implementation of visual effects such as fading in or fading out of windows, as well as shadows, glow effects, and the like.

Additional performance enhancement is achieved, in one embodiment, by tagging the topmost layer that has changed since the last update. If the front-to-back compositing operation stops before reaching the tagged layer, it is not necessary to write the result to the output bitmap (the frame buffer), since the output bitmap already contains the same data, from the last update. The present invention can thus avoid unnecessary write operations in such a situation, and thereby improve system performance, particularly when output is being written to the frame buffer.

In one embodiment, additional optimization is achieved by initially subdividing the destination bitmap into a number of tiles, each tile containing the same stack of layers to be rendered. By performing such subdivision, the present invention is able to make determinations as to which layers may contribute to the final image on a tile-by-tile basis rather than on a pixel-by-pixel basis. This simplifies the bounds-checking process, and minimizes the number of calculations that need be made in the innermost loop of the process, thus improving overall performance.

The present invention can be implemented, for example, in a windowing system to provide efficient rendering of overlapping translucent windows in an improved graphical user interface.

DETAILED DESCRIPTION OF THE PREFERRED EMBODIMENTS

Figure 1:
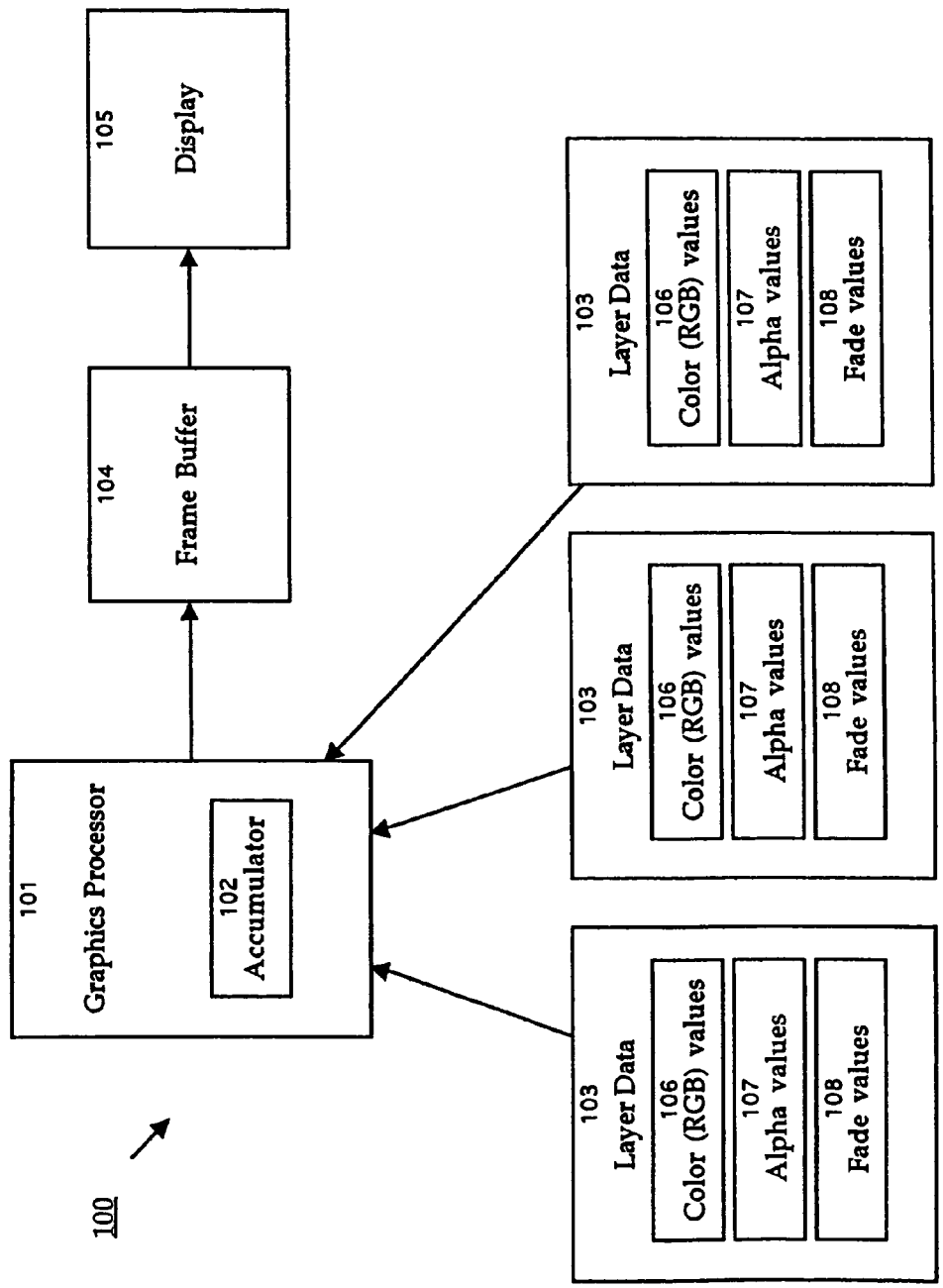
FIG. 1 is a block diagram of the overall architecture of an embodiment of the present invention.

Referring now to FIG. 1, there is shown a block diagram of the overall architecture of one embodiment of the present invention. In this embodiment, system 100 is implemented on a conventional personal computer having a central processing unit and/or graphics processor 101 and a display 105 such as a cathode ray tube (CRT) or liquid crystal display (LCD) device. The steps of the present invention may be stored as software in an operating system or application software for execution by processor 101 in the computer, as is known in the art. For example, system 100 may be implemented on a Macintosh® computer, from Apple Corporation, running the MacOS operating system, and the software may form part of a Window Server module within the operating system.

Layer data 103 represent source images to be composited for display on display 105. For example, layer 103 may include bitmap representations of windows, graphical user interface (GUI) elements, photographs, drawings, animations, and the like. In one embodiment, each layer 103 may be of any arbitrary shape and size, and may contain translucent, transparent, and opaque regions, in any combination desired. In one embodiment, each layer 103 contains a plurality of data structures 106-108 for storing color (RGB) values, alpha values, and fade values, as appropriate. Any number of layers 103 may be provided for processing by system 100.

Graphics processor 101 may be implemented as a conventional central processing unit (CPU) of the computer, or it may be a dedicated processor for graphics operations. Accumulator 102, in one embodiment, is a register or memory location for temporary storage of values being calculated. As will be described below, more than one accumulator 102 may be provided, and in one embodiment the present invention is able to process several pixels in parallel by employing multiple accumulators 102.

Frame buffer 104 is an area of memory, such as random access memory (RAM), that is reserved for storage of display data, as is known in the art. In one embodiment, frame buffer 104 is connected to display 105 so that display 105 outputs the contents of frame buffer 104 after processor 101 has written results to frame buffer 104. In other embodiments, processor 101 may write images to other areas of memory (not shown), or to disk (not shown), or to some other storage device, rather than to frame buffer 104.

Figure 2:
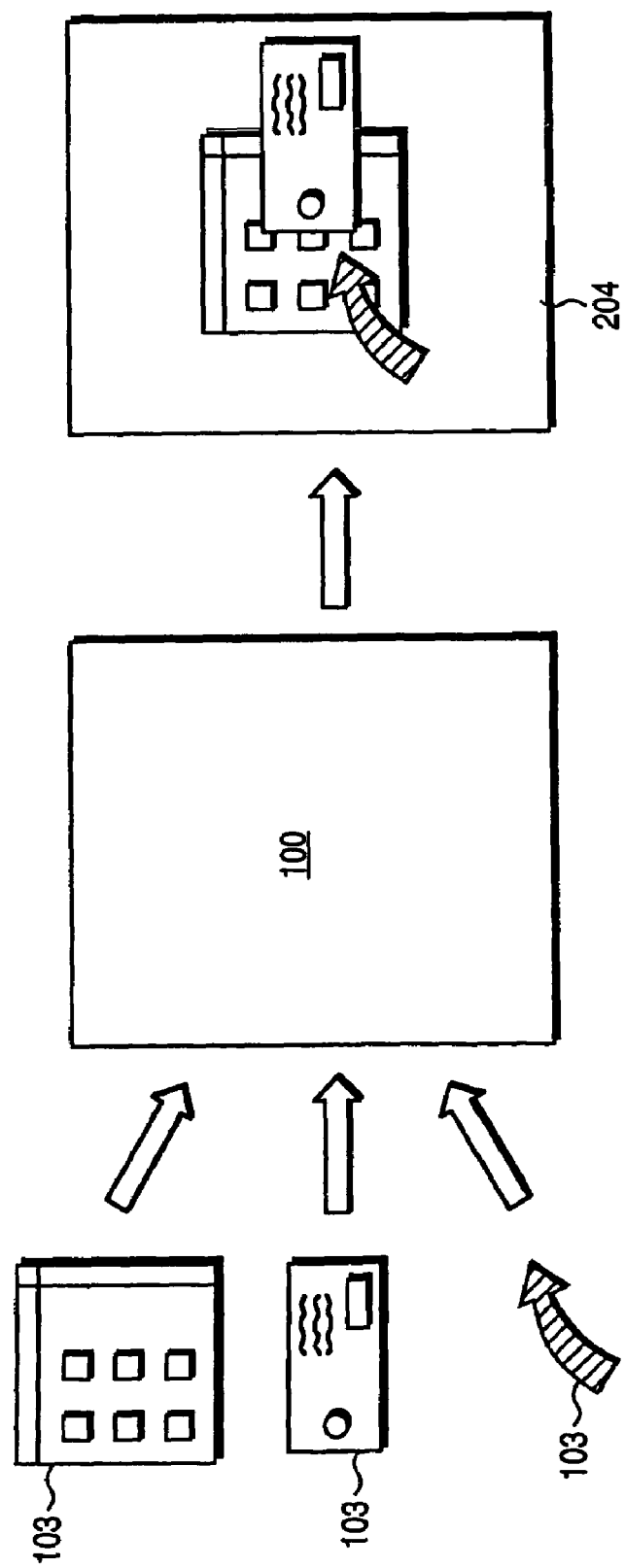
FIG. 2 is a diagram showing an example of the output of the present invention.

Referring now to FIG. 2, there is shown an example of the output of the present invention. Three layers 103 are provided as input to system 100 for compositing. Output image 204, as may be shown on display 105, contains all three layers 103 overlapping one another. As can be seen from the Figure, layers 103 can be of any arbitrary shape, and may contain opaque, transparent, and/or translucent regions, in any combination. In one embodiment, all layers are provided as rectangular regions, so that arbitrarily-shaped images can be represented as rectangular layers having both transparent and non-transparent regions. Compositing of transparent layers or areas is a trivial operation, as the underlying image is unaffected by the presence of an overlapping transparent area.

In one embodiment, each layer 103 contains a plurality of pixels, each pixel having a color value. The color value of each pixel represents a color according to a conventional color-encoding scheme (such as a red-green-blue, or RGB color encoding scheme). In one embodiment, each pixel also has an alpha value representing a relative degree of transparency (or opacity) for that pixel. Such a technique facilitates full control over the transparency of each layer on a pixel-by-pixel basis, permitting translucency effects as well as arbitrarily-shaped images.

As shown in the example of FIG. 2, the present invention is able to generate output that combines several translucent and complex-shaped windows. Thus, the invention can be employed to enable an on-screen windowing system containing a graphically rich user interface in which overlapping elements or windows are translucent, so that the user can see underlying elements.

Figure 3:
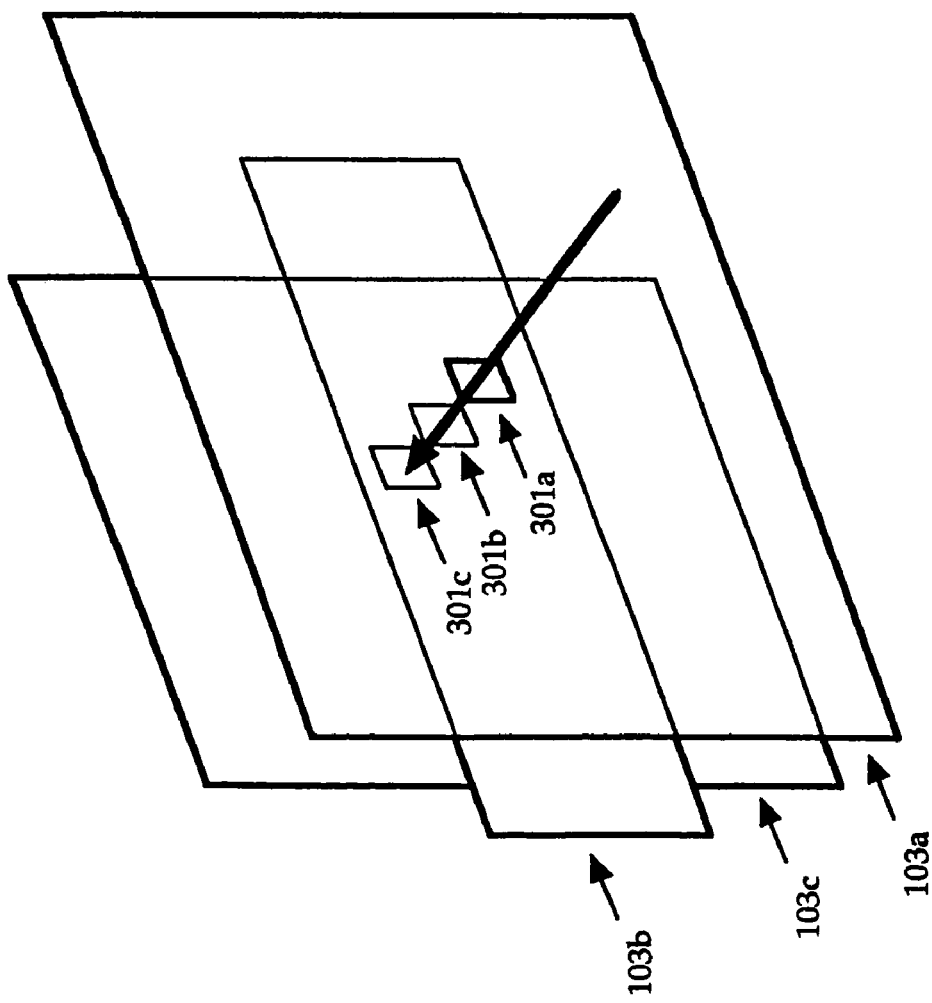
FIG. 3 is a diagram showing top-down processing of a pixel according to the present invention.

Referring now to FIG. 3, there is shown an example of top-down processing of a pixel according to the present invention. In one embodiment, the present invention processes each pixel of the image separately. In another embodiment, several pixels may be processed in parallel using a number of accumulators, as will be described below.

For each pixel 301 in the image, one or more layers 103 may contribute to the color value of pixel 301. Generally, layers 103 that may contribute to the color value are those layers 103 which contain image data corresponding to the physical coordinates associated with the image pixel being processed. Before processing a pixel 301, accumulator 102 is reset. Then, for each contributing pixel 301 in one of layers 103, the present invention accumulates the color and alpha values of the contributing pixel 301 to derive a final value for the image pixel.

As is known in the art, each layer 103 has a relative "vertical" position. The vertical position of a layer 103 is a conceptual representation of the order in which the layers are stacked on one another. Thus, if the final image portrays layer B as a window that partially obscures a portion of layer A, layer B would be considered "on top" of layer A.

In one embodiment, the invention reads pixel data from layers 103 in top-down order, with the topmost layer 103 being accumulated first. As each pixel's data is read, it is merged with the current value of accumulator 102 using a compositing method as described in more detail below. In one embodiment, the invention accumulates alpha values as well as color values. If the accumulated alpha value indicates full opacity before all layers 103 have been processed, processing for the current pixel may be terminated, since any layers 103 beneath the current layer would be completely obscured by the layers 103 that have already been processed. In this way, the present invention is able to avoid reading and processing pixel data that does not contribute to the final image.

Once the invention has read all layers 103 that may contribute to pixel 301, or once full opacity has been reached, the value in accumulator 102 is output. In one embodiment, the value is written directly to frame buffer 104. Since the accumulation of color values occurs in accumulator 102, only one write to frame buffer 104 is required, so that excessive flickering of the on-screen display (due to multiple writes to frame buffer 104) is avoided. Furthermore, since accumulation occurs in accumulator 102, no off-screen buffer for temporary storage of an image is required, as accumulator 102 out-put can be written directly to frame buffer 104.

Figure 6:
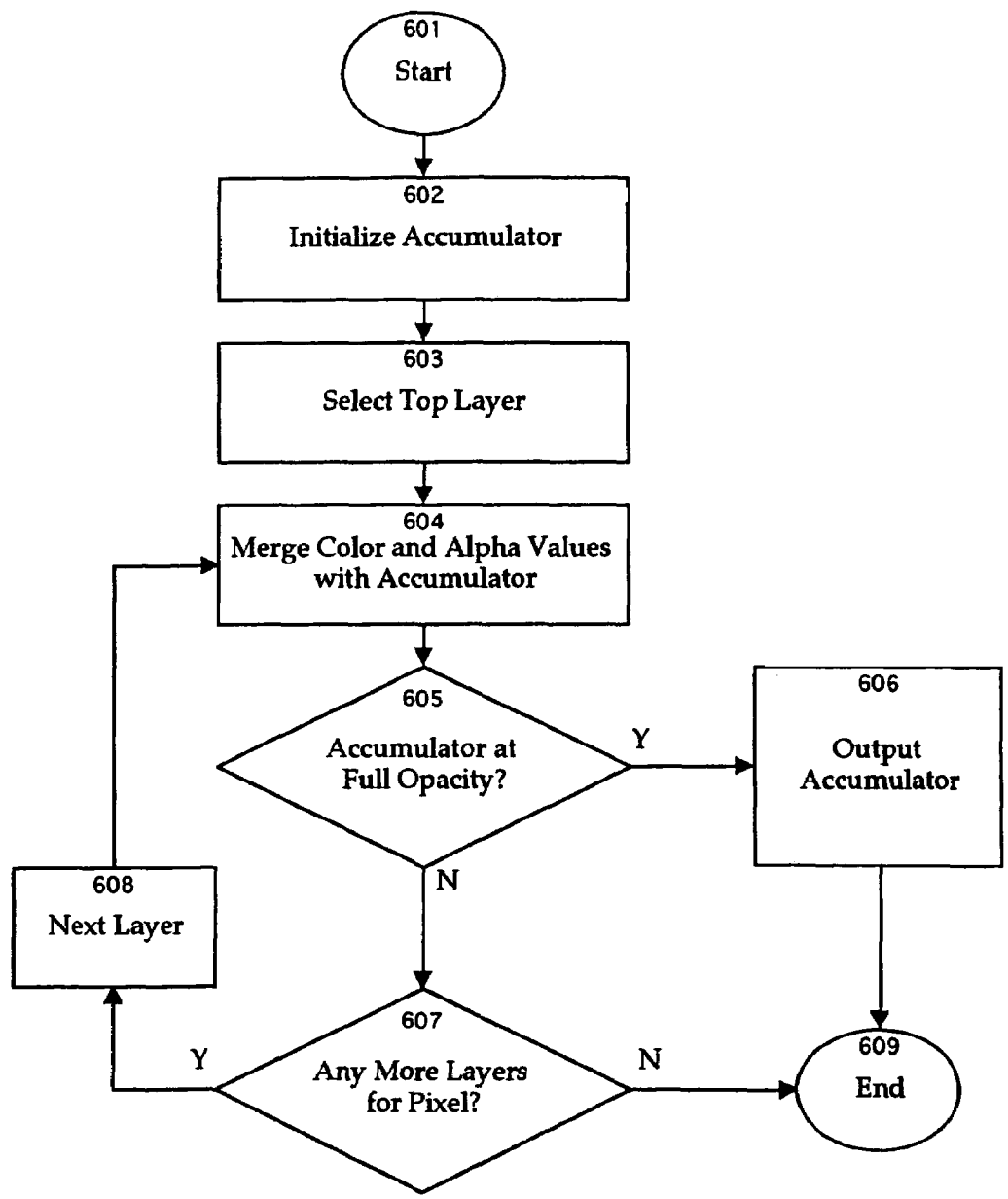
FIG. 6 is a flowchart showing the operation of one embodiment of the present invention.

Referring now to FIG. 6, there is shown a flowchart of the operation of the invention according to one embodiment. The steps shown in FIG. 6 may be performed for each pixel in the final image for which multiple layers have corresponding pixels. Processor 101 initializes 602 accumulator 102 with initial color and alpha values. In one embodiment, accumulator 102 is implemented as a register in processor 101. In another embodiment, two or more accumulators 102 are provided, so that the steps of FIG. 6 are performed concurrently for a number of pixels.

Processor 101 selects 603 a layer 103 from among those layers having a pixel corresponding to the position of the pixel being rendered. In one embodiment the topmost layer 103 is selected, so as to implement top-down processing, though in other embodiments, any layer 103 may be selected.

Processor 101 identifies a pixel in layer 103 having a position corresponding to the image pixel being rendered, and merges 604 the color value of the identified pixel with the current value of accumulator 102. In one embodiment, processor 101 also merges the alpha value of the identified pixel with an alpha value stored in accumulator 102.

Processor 101 then determines 605 whether any remaining layers can contribute to the color value of the image pixel being rendered. In one embodiment, where top-down processing is being used, this determination is made by checking whether the accumulated alpha value indicates that full opacity has been reached. If full opacity has been reached, no underlying pixels can contribute to the final color value of the image pixel. If no remaining layers can contribute, the accumulated color value in accumulator 102 is output 606. In one embodiment, the value is output to frame buffer 104 for display on display 105, though output to other memory locations or storage devices may instead be performed.

If in step 605, accumulator 102 does not indicate full opacity, or some other determination is made that additional layers 103 need be processed, system determines 607 whether any additional layers exist that have pixels corresponding to the image pixel being rendered. If not, the accumulated color value in accumulator 102 is output 606.

If in step 607, additional layers 103 remain, processor 101 selects 608 another layer 103 from among those layers having a pixel corresponding to the position of the image pixel being rendered. In one embodiment the topmost remaining layer 103 is selected, so as to implement top-down processing, though in other embodiments, any remaining layer 103 may be selected. Processor 101 then returns to step 604.

Steps 604, 605, and 607 are repeated until either full opacity has been reached, or some other determination is made that any remaining layers 103 cannot contribute to the color value of the image pixel being processed, or no layers 103 remain.

The steps of FIG. 6 may be repeated for each pixel in the image, as needed. Pixels may be processed in any order.

In one embodiment, in step 603 processor 101 loops through each successive layer (starting with the top layer) until it finds a layer containing a non-transparent pixel for the pixel position being rendered. If the first non-transparent pixel is found to be fully opaque, the result can be immediately written to the frame buffer without performing any merging operations. If the pixel is not fully opaque, blending and merging operations continue with step 604.

Figure 7:
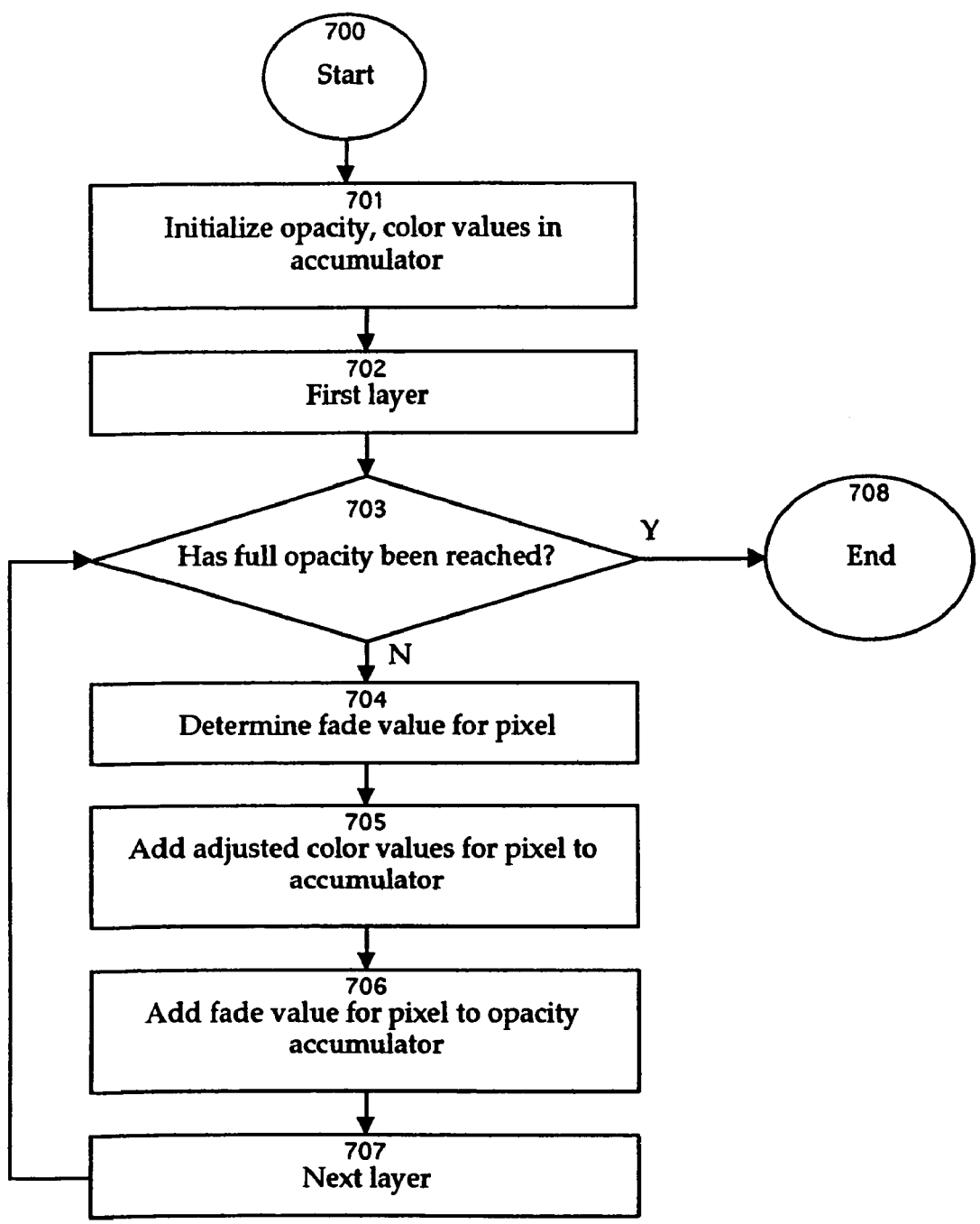
FIG. 7 is a flowchart showing color and alpha merging according to one embodiment of the present invention.

In one embodiment, processor 101 merges color and alpha values in step 604 according to known compositing techniques, such as those described in T. Porter et al., in "Compositing Digital Images", in *Proceedings of SIGGRAPH '84*, 1984, pp. 253-59. Referring now to FIG. 7, there is shown a method of merging color and alpha values. Opacity and color values are initialized 701 by setting values to zero. A first layer is selected 702. If full opacity has been reached (indicated by an opacity value reaching a predetermined threshold, such as 1.0), the process ends 708.

As long as full opacity has not been reached, and additional layers exist, steps 703 through 707 are repeated. In 704, the fade value for the pixel is determined, using the equation:

$$\gamma = \delta_n \cdot \alpha_n(x,y) \cdot (1-\alpha) \tag{Eq. 1}$$

where:
- $\delta_n$ is the overall fade value for layer n;
- $\alpha_n(x,y)$ is the opacity (alpha) value of the current pixel in layer n; and
- $\alpha$ is the accumulated opacity (alpha) value.

In 705, the color values for the pixel are adjusted by the fade value, and added to the accumulator, using the equations:

$$r = \gamma \cdot r_n(x,y) + r \tag{Eq. 2}$$

$$g = \gamma \cdot g_n(x,y) + g \tag{Eq. 3}$$

$$b = \gamma \cdot b_n(x,y) + b \tag{Eq. 4}$$

where:
- $r_n(x,y)$, $g_n(x,y)$, $b_n(x,y)$ are color values of the current pixel in layer n; and
- r, g, b are the accumulated color values.

In 706, the fade value for the pixel is added to the opacity accumulator, by:

$$\alpha = \gamma + \alpha \qquad \text{(Eq. 5)}$$

In 707, the next layer is selected (n is incremented).

In the embodiment represented by FIG. 7, the invention stores input layer values without pre-multiplication, and stores accumulated values in pre-multiplied form. This technique reduces the number of operations that need be performed in the loop, since the final color values are already in multiplied form.

The fade value $\delta_n$ scales the opacity of the layer as a whole. The use of the fade value is not essential to practicing the present invention; however, it facilitates effects such as fade-out or translucent dragging of layers. Fade values are known in some applications, such as PhotoShop, from Adobe Corporation.

The above description merely portrays one possible technique for merging color and alpha values in accumulator 102. Other compositing techniques may be used, as will be apparent to one skilled in the art. In one embodiment, each layer could be associated with a different compositing method, if appropriate.

It has been found that the above-described technique is able to generate an image pixel using at most N+1 read/write operations (N reads, 1 write), where N is the number of layers that can contribute to the pixel. Prior art systems generally require 3(N−1) read/write operations (2(N−1) reads, (N−1) writes). For example: if four layers A, B, C, and D are available, the present invention would perform the following read/write operations:

Read A
Read B
Read C
Read D
Write result

Thus, where N=4, at most N+1=5 operations are performed. By accumulating the result in accumulator 102, the total number of read/write operations is significantly reduced. In addition, the pixel-by-pixel top-down approach of the present invention further reduces the number of operations to be performed.

For example, one prior art technique known as the "Painter's Algorithm", and described in Foley et al., *Computer Graphics: Principles and Practice*, 1990, at p. 673, would composite the four layers as follows:

Read C
Read D
Write result of C+D
Read B
Read result of C+D
Write result of B+C+D
Read A
Read result of B+C+D
Write result of A+B+C+D Thus, where N=4, the prior art technique performs 3(N−1)=9 read/write operations. In addition, all nine read/write operations are performed even if some of the underlying layers may not contribute to the final result; whereas the present invention is able to reduce the number of operations when some layers may not contribute.

In addition to reducing the number of read/write operations, the present invention also reduces the number of computation operations involved, as can be seen from the above example.

In one embodiment, further optimization may be achieved as follows. System 100 can tag the topmost layer 103 that has been changed since the last time data has been written to frame buffer 104. If, in performing the front-to-back processing method described above, processor 101 stops before reaching the tagged layer 103, it is not necessary to write the new image pixel to frame buffer 104, since frame buffer 104 will already contain the same value. Thus, in a system where access to video memory is relatively slow, significant performance improvements can be attained by avoiding unnecessary writes to frame buffer 104.

Figure 4:
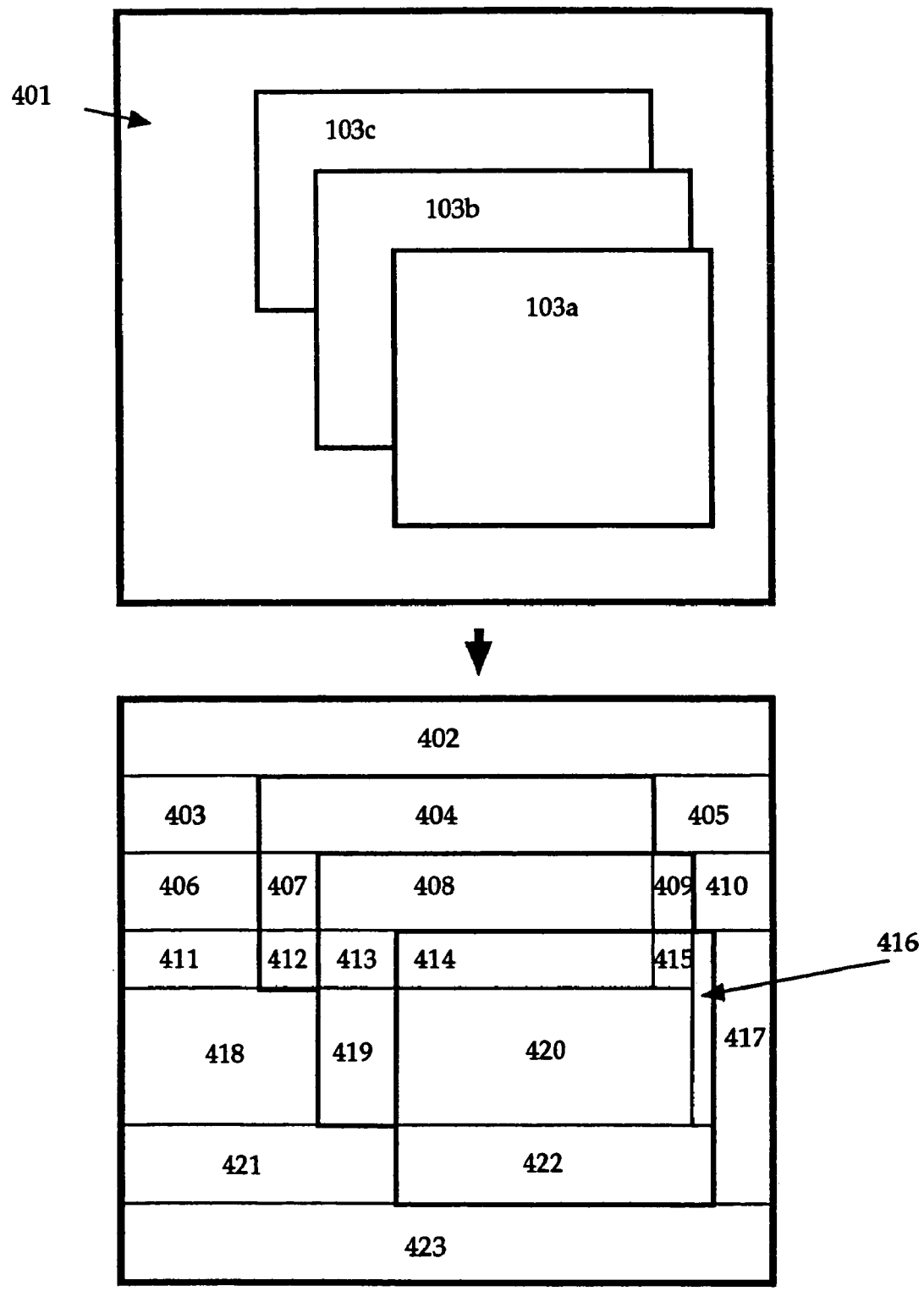
FIG. 4 is a diagram showing an example of tile subdivision according to one embodiment of the present invention.

In one embodiment, the invention subdivides the image area in a pre-processing step, before beginning the method described above in connection with FIG. 6. Referring now to FIG. 4, there is shown an example of image subdivision according to this embodiment.

Image 401 contains three layers 103a, 103b, and 103c to be composited. The image area can thus be subdivided into tiles 402 through 423. For each tile, a given set of layers 103 is able to affect pixels within the tile. Thus, in the example of FIG. 4:

tiles 402, 403, 405, 406, 410, 411, 417, 418, 421, and 423 are rendered without accessing any layers (background only);

tiles 404, 407, and 412 are rendered using data from layer 103c;

tiles 408 and 413 are rendered using data from layers 103b and 103c;

tiles 409 and 419 are rendered using data from layer 103b;

tile 414 is rendered using data from layers 103a, 103b, and 103c;

tiles 415 and 420 are rendered using data from layers 103a and 103b; and tiles 416 and 422 are rendered using data from layers 103a.

Thus, each tile contains the same stack of layers to be combined in rendering the final image. In this way, most of the decision steps as to which layers may contribute to the values for a given pixel may be performed outside the innermost loop, since such decisions are constant for all pixels within a given tile. This simplifies the bounds-checking processes and improves performance, since it reduces the number of times such decision steps are performed.

Figure 5:
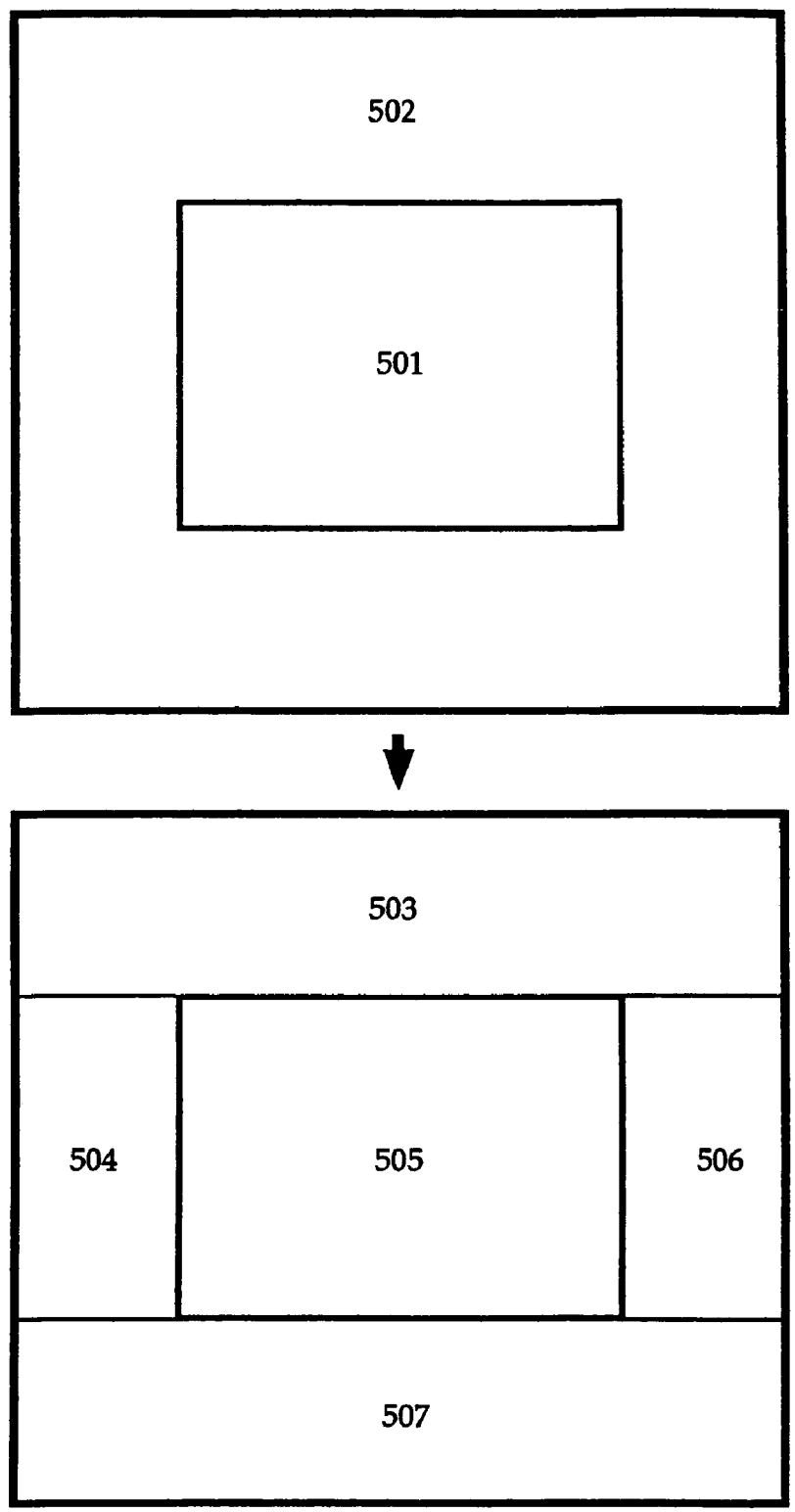
FIG. 5 is a diagram showing an example of tile subdivision according to one embodiment of the present invention.

Referring now to FIG. 5, there is shown an example of the subdivision technique of one embodiment of the present invention. Tile 502 represents a previously subdivided tile, or the entire image. Layer 501 is superimposed on tile 502, resulting in subdivision of tile 502 into new tiles 503 through 507. Generalizing, this tile subdivision operation is performed as follows: for each layer 501 that has at least one side cutting through tile 502, tile 502 is subdivided by extending the top and bottom boundaries of layer 501 to the left and right edges of tile 502. Resulting tiles 503 through 507 are stored in a tile list for later retrieval by processor 101 when processing individual pixels. Some of new tiles 502 through 507 may have zero width or height, such as when layer 501 is not completely inside tile 502. If so, such degenerated rectangles are not stored in the tile list. Tile subdivision is described in more detail below, in connection with FIG. 8.

Other techniques of tile subdivision may be performed that may produce other results. It has been found that, for pixel traversal algorithms that are oriented along horizontal scan-lines, subdivision resulting in a minimal number of vertical cuts is advantageous, whereas the number of horizontal cuts is not as important.

In one embodiment, the tile list is sorted in y-order before actual compositing begins. By performing this step, the system is able to execute the update in a more orderly fashion, and reduce visible "tearing" that can occur when a number of updates are requested in quick succession.

In one embodiment, after initial tile subdivision is performed, the tile list is traversed and adjacent tiles are joined if possible, so as to reduce the tile count for the compositing phase. Thus, in the example of FIG. 4, tiles 402, 403, 405, 406, 410, 411, 417, 418, 421, and 423 could be merged into one tile; tiles 404, 407, and 412 could be merged into a second tile; and so on. Joining tiles is described in more detail below, in connection with FIG. 9.

In one embodiment, certain tiles can be marked "frozen", indicating that they should not be further subdivided even when other layers intersect the tile. This technique serves to avoid further splitting when a tile has been created that contains a part of a completely opaque layer, since all layers that lie below the opaque one cannot be visible, so that further subdivision is not needed.

When tile subdivision is combined with the method described above in connection with FIG. 6, all pixels within a particular tile may be processed before proceeding to the next tile. In this manner, determinations as to which layers may contribute to output values may be performed at the tile level, rather than at the pixel level, thus reducing the number of operations to be performed. In addition, in one embodiment, special case algorithms may be developed for certain combinations of layers to be composited, and applied to tiles containing those combinations.

In one embodiment, as described above, several pixels may be processed simultaneously. For example, in one embodiment, eight pixels are processed in parallel, using a processor 101 that is capable of accumulating eight values simultaneously, such as AltiVec or MMX-enabled processors. Parallel processing may also be advantageous when the invention is implemented on systems having a large number of execution units, such as the IA-64 architecture from Intel corporation.

Figure 8:
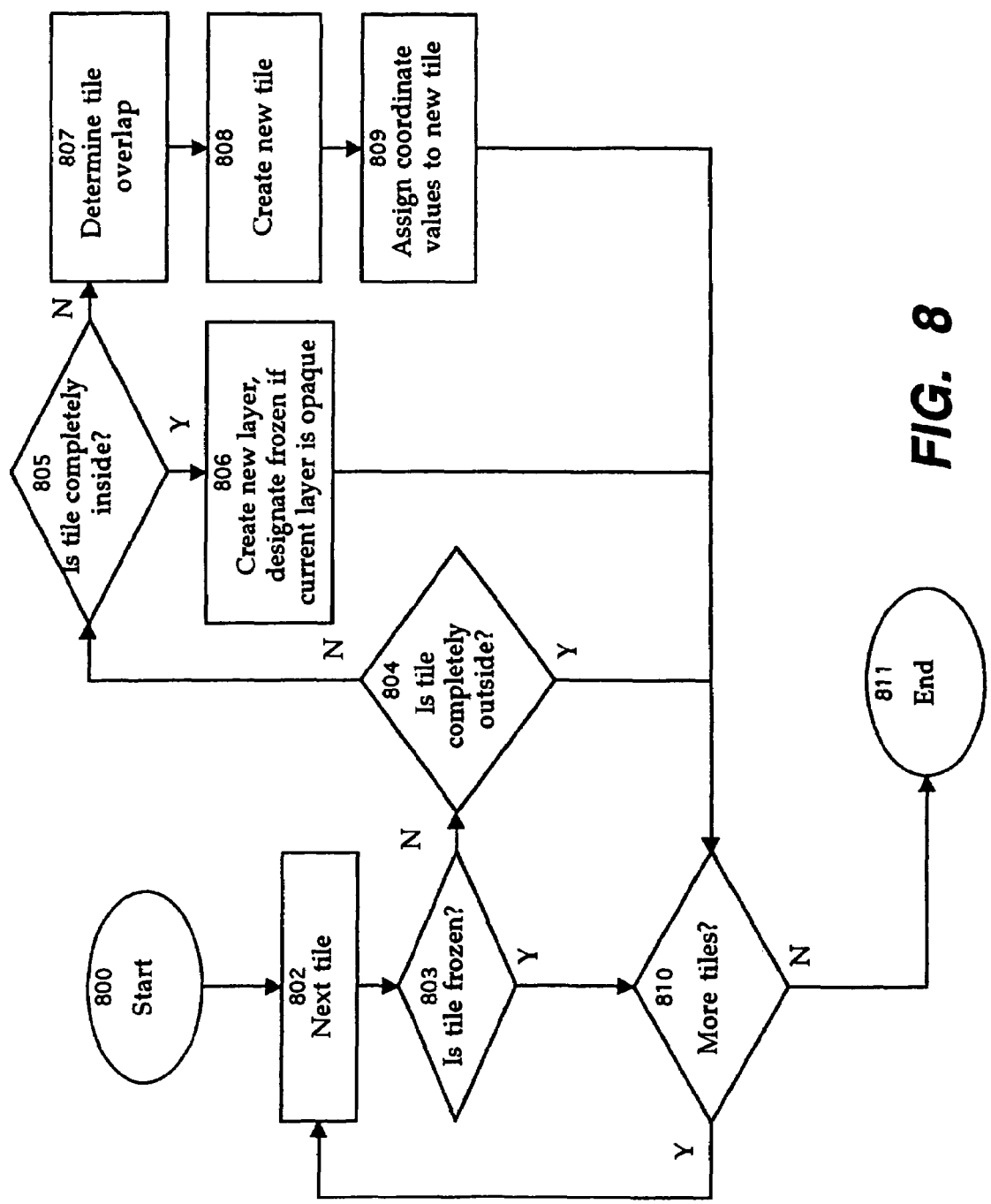
FIG. 8 is a flowchart showing tile subdivision according to one embodiment of the present invention.

Referring now to FIG. 8, there is shown a flowchart depicting tile subdivision according to one embodiment of the present invention. The system starts with a single tile, which represents the screen area, and then adds layers top-down by calling cutTiles(struct TileInfo *tile, int x,int y, int w,int h, struct Layer *layer, BOOL opaque);

which extends the tile list as needed. The opaque flag is used to freeze tiles, as described above.

The cutTiles routine may be implemented as shown in the flowchart of FIG. 8. The steps of FIG. 8 are repeated for each existing tile in the image, so that processor 101 begins by selected 802 the next tile, if any. If the tile is frozen 803, or if the tile is completely outside 804 the area specified in the call to cutTiles, processor 101 determines 810 any more tiles exist, and proceeds 802 to the next tile. If no more tiles exist, the process ends 811.

If the tile is completely inside 805 the specified area, a new layer is created 806 corresponding to the tile, and is designated frozen if the area is opaque.

If the tile is neither completely inside or completely outside the specified area, there is overlap. Tile overlap is determined 807, and a new tile is created 808 accordingly, to represent the overlapping region. Coordinate values are assigned 809 to the new tile.

Once the tile has been processed, processor 101 determines 810 whether additional tiles exist, and if so, returns to 802 to select the next tile.

Figure 9:
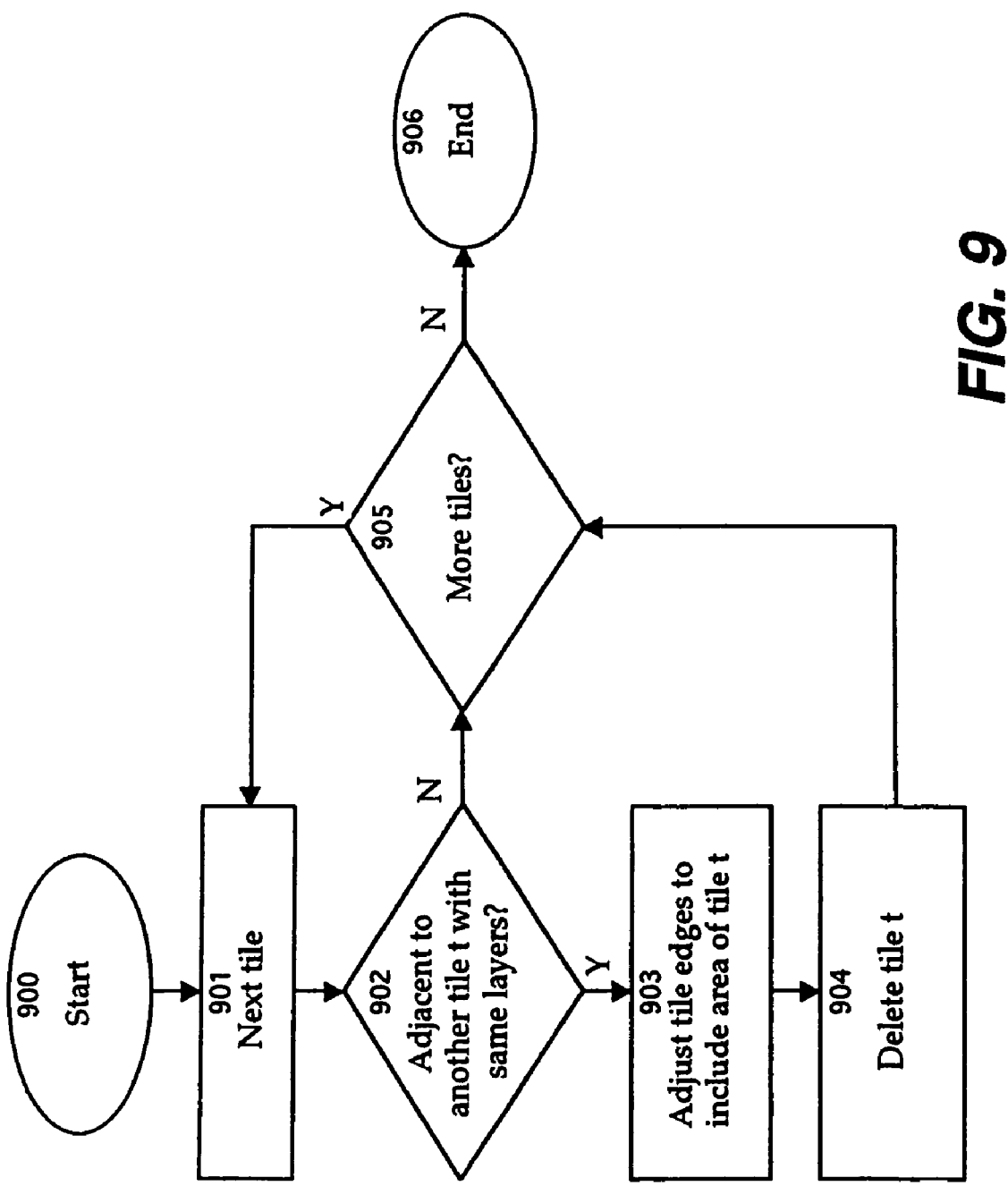
FIG. 9 is a flowchart showing a method of joining tiles according to one embodiment of the present invention.

As described above, in one embodiment, after initial tile subdivision is performed, the tile list is traversed and adjacent tiles are joined if possible, so as to reduce the tile count for the compositing phase. Referring now to FIG. 9, there is shown a flowchart depicting a method of joining tiles according to one embodiment.

Processor 101 selects a tile 901 to be processed. If in 902, processor 101 determines that the tile is adjacent to another tile t having the same set of layers, the tile edges are adjusted 903 to include the area of tile t, and tile t is deleted 904. If more tiles are to be processed 905, processor 101 returns to 902.

In one embodiment, the above-described invention is used to implement a windowing system capable of displaying overlapping translucent windows in a graphical user interface. Each window is represented as one or more layers, as shown in FIG. 2. Color and alpha values associated with a window are composited as described above for overlapping tiles. When an application draws into the layer bitmap corresponding to its backing store, and requests an update on the screen, the present invention updates the screen by reassembling the corresponding portion of the frame buffer using the compositing techniques described above. Opening, closing, resizing, or moving a window triggers the tile subdivision method described above (if it is being used).

In such a windowing system, fade values as described above can be used to implement fading in and out of windows when they are opened or closed. This is accomplished by gradually changing the fade value of the layer corresponding to the window being opened or closed.

A windowing system using the above-described techniques may also implement an event routing scheme that differs from those associated with conventional overlapping windowing systems in which the topmost window at the cursor location is normally the target of a cursor-driven event. In the present system, for example, when a user performs a mouse click, the mouse-click event is sent to a particular window, which may not necessarily be the topmost window at the cursor location. In one embodiment, the topmost non-transparent window at the cursor location is the target of the mouse event. In another embodiment, some layers may be designated as not accepting events at all; for example, a layer that contains the shadow of a window should not accept any events. As will be clear to one skilled in the art, alternative event routing schemes could also be used in connection with a windowing system as implemented according to the present invention.

From the above description, it will be apparent that the invention disclosed herein provides a novel and advantageous system and method of rendering translucent and complex-shaped layers in a display system. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented method for combining at least two overlapping layers to render an image, the image containing a plurality of image pixels, each overlapping layer containing a plurality of layer pixels, each layer pixel corresponding to one of the image pixels, the method comprising:

a) defining a tile, the tile comprising a subset of the image pixels delimited according to an area of overlap among a set of at least two layers, so that a first portion of the image lies within the tile and a second portion of the image lies outside the tile; and b) processing the first portion of the image distinctly from the second portion of the image by, for at least one image pixel in the defined tile:
  b.1) initializing an accumulator color value;
  b.2) selecting at least one layer in the set of at least two layers, each selected layer having a layer pixel corresponding to the image pixel, the layer pixel having a color value;
  b.3) for each selected layer, compositing the color value of the layer pixel with the accumulator color value and storing the resulting accumulator color value in a computer readable memory; and
  b.4) outputting the accumulator color value;
wherein, for each defined tile, the set of layers that overlap within the tile is constant throughout the entirety of the tile.

2. The method of claim 1, wherein b.2) comprises selecting a topmost remaining layer in the set of at least two layers.

3. The method of claim 1, wherein b.4) comprises outputting the accumulator color value to a frame buffer.

4. The method of claim 1, further comprising:
c) displaying the image.

5. The method of claim 1, further comprising:
c) repeating b) for each image pixel in the defined tile.

6. The method of claim 1, wherein b) comprises performing b.1) through b.4) for at least two image pixels concurrently.

7. The method of claim 1, further comprising:
c) concurrently with b), for a second image pixel in the defined tile:
  c.1) initializing a second accumulator color value;
  c.2) selecting at least one layer in the set of at least two layers, each selected layer having a second layer pixel corresponding to the second image pixel, the second layer pixel having a color value;
  c.3) for each selected layer, compositing the color value of the second layer pixel with the second accumulator color value and storing the resulting second accumulator color value; and
  c.4) outputting the second accumulator color value.

8. The method of claim 1, wherein at least one of the layers in the set of at least two layers is non-rectangular.

9. The method of claim 1, wherein at least one pixel of at least one of the layers in the set of at least two layers is transparent, and wherein compositing the color value of the layer pixel with the accumulator color value comprises:
responsive to the layer pixel being transparent, retaining the accumulator color value; and
responsive to the layer pixel not being transparent, compositing the color value of the layer pixel with the accumulator color value.

10. The method of claim 1, further comprising:
c) repeating a) and b) for at least one second defined tile.

11. The method of claim 1, wherein each layer comprises a window, and wherein the image comprises a display for a windowing system.

12. The method of claim 1, wherein a first one of the layers in the set overlaps a second one of the layers in the set, and wherein each layer comprises bounds defined by edges, and wherein at least one edge of the first layer lies within the bounds of the second layer, and wherein a) comprises:
subdividing the second layer along a line corresponding to an extension of the at least one edge of the first layer that lies within the bounds of the second layer.

13. The method of claim 1, wherein b.3) comprises compositing the color value of the layer pixel with the accumulator color value using at least one of an opacity value of the layer pixel, the fade value of the selected layer and an accumulator opacity value.

14. A system for combining at least two overlapping layers to render an image, the image containing a plurality of image pixels, each overlapping layer containing a plurality of layer pixels, each layer pixel corresponding to one of the image pixels, the system comprising:
a tile subdivider, for defining a tile, the tile comprising a subset of the image pixels delimited according to an area of overlap among a set of at least two layers, so that a first portion of the image lies within the tile and a second portion of the image lies outside the tile;
one or more accumulators, for initializing an accumulator color value for at least one image pixel in the defined tile;
a layer selector, coupled to the tile subdivider, for successively selecting each of at least a subset of the layers in the set of at least two layers, each selected layer having a layer pixel corresponding to the image pixel, the layer pixel having a color value;
a compositor coupled to the layer selector and to the one or more accumulators, for, for each successively selected layer, compositing the color value of the layer pixel with the accumulator color value, and storing the results in the one or more accumulators; and
an output device, coupled to the one or more accumulators, for outputting the accumulator color value;
wherein in combining the overlapping layers, the one or more accumulators, the layer selector, and the compositor process the first portion of the image distinctly from the second portion of the image;
wherein, for each defined tile, the set of layers that overlap within the tile is constant throughout the entirety of the tile.

15. The system of claim 14, wherein the compositor composites the color value of the layer pixel with the accumulator color value using at least one of an opacity value of the layer pixel, the fade value of the selected layer and an accumulator opacity value.

16. The system of claim 14, wherein the subset of overlapping layers selected by the layer selector is determined responsive to a comparison of an accumulator opacity value with a full opacity value.

17. The system of claim 14, wherein the layer selector successively selects layers by selecting a topmost remaining layer in the set of at least two layers.

18. The system of claim 14, wherein the output device outputs the accumulator color value to a frame buffer.

19. The system of claim 14, further comprising a display device, coupled to the output device, for displaying the image.

20. The system of claim 14, wherein each of the layer selector, compositor, one or more accumulators, and output device operates on each image pixel in the defined tile.

21. The system of claim 14, wherein the layer selector, compositor, one or more accumulators, and output device each operate on at least two image pixels concurrently.

22. The system of claim 14, wherein:
one of the one or more accumulators initializes a second accumulator color value for a second image pixel in the defined tile;
the layer selector, concurrently with successively selecting each of at least a sub-set of the layers in the set of at least two layers having a layer pixel corresponding to the first image pixel, selects one of the layers in the set of at least two layers having a second layer pixel corresponding to the second image pixel, the second layer pixel having a color value;

the compositor, concurrently with compositing the first color value of the layer pixel with the accumulator color value, composites the color value of the second layer pixel with the second accumulator color value and stores the result in the one of the one or more accumulators; and the output device outputs the second accumulator color value.

23. The system of claim 14, wherein at least one of the layers in the set of at least two layers is non-rectangular.

24. The system of claim 14, wherein at least one pixel of at least one of the layers in the set of at least two layers is transparent, and wherein the compositor:

responsive to the layer pixel being transparent, retains the accumulator color value; and responsive to the layer pixel not being transparent, composites the color value of the layer pixel with the accumulator color value.

25. The system of claim 14, wherein:

the tile subdivider defines as a second tile a second area of overlap between a second set of at least two layers, the tile comprising a second subset of the image pixels;

one of the one or more accumulators initializes a second accumulator color value for at least one image pixel in the second defined tile;

the layer selector successively selects each of at least a subset of the layers in the second set of at least two layers, each selected layer having a layer pixel corresponding to the image pixel, the layer pixel having a color value;

the compositor, for each successively selected layer, composites the color value of the layer pixel with the second accumulator color value and stores the re-sult in one of the one or more accumulators; and the output device outputs the second accumulator color value.

26. The system of claim 14, wherein each layer comprises a window, and wherein the image comprises a display for a windowing system.

27. The system of claim 14, wherein a first one of the layers in the set overlaps a second one of the layers in the set, and wherein each layer comprises bounds defined by edges, and wherein at least one edge of the first layer lies within the bounds of the second layer, and wherein the tile subdivider subdivides the second layer along a line corresponding to an extension of the at least one edge of the first layer that lies within the bounds of the second layer.

28. A system for combining at least two overlapping layers to render an image, the image containing a plurality of image pixels, each overlapping layer containing a plurality of layer pixels, each layer pixel corresponding to one of the image pixels, the system comprising:

a tile subdivider, for defining a tile, the tile comprising a subset of the image pixels delimited according to an area of overlap among a set of at least two layers, so that a first portion of the image lies within the tile and a second portion of the image lies outside the tile;

one or more accumulators, for initializing an accumulator color value for at least one image pixel in the defined tile;

a layer selector, coupled to the tile subdivider, for successively selecting each of at least a subset of the layers in the set of at least two layers, each selected layer having a layer pixel corresponding to the image pixel, the layer pixel having a color value;

a compositor coupled to the layer selector and to the one or more accumulators, for, for each successively selected layer, compositing the color value of the layer pixel with the accumulator color value, and storing the results in the one or more accumulators; and an output device, coupled to the one or more accumulators, for outputting the accumulator color value;

wherein in combining the overlapping layers, the one or more accumulators, the layer selector, and the compositor process the first portion of the image distinctly from the second portion of the image;

wherein, for each defined tile, the set of layers that overlap within the tile is homogenous throughout the entirety of the tile.

29. A computer program product for combining at least two overlapping layers to render an image, the image containing a plurality of image pixels, each over-lapping layer containing a plurality of layer pixels, each layer pixel corresponding to one of the image pixels, comprising:

a computer-readable memory medium; and computer-readable program code, encoded on the computer-readable memory medium for:

defining a tile, the tile comprising a subset of the image pixels delimited according to an area of overlap among a set of at least two layers, so that a first portion of the image lies within the tile and a second portion of the image lies outside the tile; and processing the first portion of the image distinctly from the second portion of the image by, for at least one image pixel in the defined tile:

initializing an accumulator color value;

selecting at least one layer in the set of at least two layers, each selected layer having a layer pixel corresponding to the image pixel, the layer pixel having a color value;

for each selected layer, compositing the color value of the layer pixel with the accumulator color value and storing the resulting accumulator color value; and outputting the accumulator color value;

wherein, for each defined tile, the set of layers that overlap within the tile is constant throughout the entirety of the tile.

30. The computer program product of claim 29, wherein:

the computer-readable program code encoded on the computer-readable memory medium selecting one of the layers comprises computer-readable program code encoded on the computer-readable memory medium selecting one of the layers in the set of at least two layers, the selected layer having a layer pixel corresponding to the image pixel, the layer pixel having a color value and an alpha value; and the computer-readable program code encoded on the computer-readable memory medium compositing the color value of the layer pixel with the accumulator color value uses at least one of an opacity value of the layer pixel, the fade value of the selected layer and an accumulator opacity value to composite the color value.

31. The computer program product of claim 29, further comprising computer-readable program code encoded on the computer-readable memory medium for determining whether layer pixels for any remaining layers by determining whether an accumulator opacity value indicates full opacity.

32. The computer program product of claim 29, wherein the computer-readable program code for selecting one of the layers comprises computer-readable program code encoded on the computer-readable memory medium causing selection of a topmost remaining layer in the set of at least two layers.

33. The computer program product of claim 29, wherein the computer-readable program code for outputting the accumulator color value comprises computer-readable program code encoded on the computer-readable memory medium for outputting the accumulator color value to a frame buffer.

34. The computer program product of claim 29, further comprising:
    computer-readable program code encoded on the computer-readable memory medium devices configured to cause a computer to display the image.

35. The computer program product of claim 30, further comprising:
    computer-readable program code encoded on the computer-readable memory medium for repeating the initializing, selecting, compositing, storing, determining, and outputting for each image pixel in the defined tile.

36. The computer program product of claim 29, wherein the computer-readable program code the initializing, selecting, compositing, storing, and outputting for at least two image pixels concurrently.

37. The computer program product of claim 29, further comprising:
    computer-readable program code encoded on the computer-readable memory medium for a second image pixel in the defined tile and concurrently with the selecting, compositing, storing, and outputting for the first image pixel:
    initializing a second accumulator color value;
    selecting at least one layer in the set of at least two layers, each selected layer having a second layer pixel corresponding to the second image pixel, the second layer pixel having a color value;
    for each selected layer, compositing the color value of the second layer pixel with the second accumulator color value and store the resulting second accumulator color value; and
    outputting the second accumulator color value.

38. The computer program product of claim 29, wherein at least one of the layers in the set of at least two layers is non-rectangular.

39. The computer program product of claim 29, wherein at least one pixel of at least one of the layers in the set of at least two layers is transparent, and wherein the computer-readable program code for compositing the color value of the layer pixel with the accumulator color value comprise comprises computer-readable program code encoded on the computer-readable memory medium for:
    responsive to the layer pixel being transparent, retaining the accumulator color value; and
    responsive to the layer pixel not being transparent, compositing the color value of the layer pixel with the accumulator color value.

40. The computer program product of claim 29, further comprising:
    computer-readable program code encoded on the computer-readable memory medium defining as a second tile an area of overlap between a set of at least two layers, the second tile comprising a second subset of the image pixels; and
    computer-readable program code encoded on the computer-readable memory medium repeating the initializing the accumulator color value, selecting one of the layers, compositing, storing, repeating, and outputting, for the second defined tile.

41. The computer program product of claim 29, wherein each layer comprises a window, and wherein the image comprises a display for a windowing system.

42. The computer program product of claim 29, wherein a first one of the layers in the set overlaps a second one of the layers in the set, and wherein each layer comprises bounds defined by edges, and wherein at least one edge of the first layer lies within the bounds of the second layer, and wherein the computer-readable program code encoded on the computer-readable memory medium defining the tile as the area of overlap comprises:
    computer-readable program code encoded on the computer-readable memory medium subdividing the second layer along a line corresponding to an extension of the at least one edge of the first layer that lies within the bounds of the second layer.

43. A system for combining at least two overlapping layers to render an image, the image containing a plurality of image pixels, each overlapping layer containing a plurality of layer pixels, each layer pixel corresponding to one of the image pixels, the system comprising:
    tile subdividing means, for defining a tile, the tile comprising a subset of the image pixels delimited according to an area of overlap among a set of at least two layers, so that a first portion of the image lies within the tile and a second portion of the image lies outside the tile;
    accumulating means for initializing an accumulator color value for at least one image pixel in the defined tile;
    layer selecting means, for successively selecting each of at least a subset of the layers in the set of at least two layers, each selected layer having a layer pixel corresponding to the image pixel, the layer pixel having a color value;
    compositing means, coupled to the layer selecting means and to the accumulating means, for, for each successively selected layer, compositing the color value of the layer pixel with the accumulator color value, and storing the results in the accumulating means; and
    output means, coupled to the accumulating means, for outputting the accumulator color value;
    wherein in combining the overlapping layers, the accumulating means, the layer selecting means, and the compositing means process the first portion of the image distinctly from the second portion of the image;
    wherein, for each defined tile, the set of layers that overlap within the tile is constant throughout the entirety of the tile.

44. The system of claim 43, wherein a first one of the layers in the set overlaps a second one of the layers in the set, and wherein each layer comprises bounds defined by edges, and wherein at least one edge of the first layer lies within the bounds of the second layer, and wherein the tile subdividing means comprises:
    means for subdividing the second layer along a line corresponding to an extension of the at least one edge of the first layer that lies within the bounds of the second layer.

45. The system of claim 43, wherein the compositing means composites the color value of the layer pixel with the accumulator color value using at least one of an opacity value of the layer pixel, the fade value of the selected layer and an accumulator opacity value.

46. The system of claim 43, wherein the subset of overlapping layers selected by the layer selecting means is determined responsive to a comparison of an accumulator opacity value with a full opacity value.

47. The system of claim 43, wherein the layer selecting means successively selects layers by selecting a topmost remaining layer in the set of at least two layers.

48. The system of claim 43, wherein the output means outputs the accumulator color value to a frame buffer.

49. The system of claim 43, further comprising display means, coupled to the output means, for displaying the image.

50. The system of claim 43, wherein each of the layer selecting means, compositing means, accumulating means, and output means operates on each image pixel in the defined tile.

51. The system of claim 43, wherein each of the layer selecting means, compositing means, accumulating means, and output means operates on at least two image pixels concurrently.

52. The system of claim 43, wherein the accumulating means initializes a second accumulator color value for a second image pixel in the defined tile, and wherein:
the layer selecting means, concurrently with successively selecting each of at least a subset of the layers in the set of at least two layers having a layer pixel corresponding to the first image pixel, selects one of the layers in the set of at least two layers having a second layer pixel corresponding to the second image pixel, the second layer pixel having a color value;
the compositing means, concurrently with compositing the first color value of the layer pixel with the accumulator color value, composites the color value of the second layer pixel with the second accumulator color value and stores the result in the accumulating means; and the output means outputs the second accumulator color value.

53. The system of claim 43, wherein at least one of the layers in the set of at least two layers is non-rectangular.

54. The system of claim 43, wherein at least one pixel of at least one of the layers in the set of at least two layers is transparent, and wherein the compositing means:
responsive to the layer pixel being transparent, retains the accumulator color value; and
responsive to the layer pixel not being transparent, composites the color value of the layer pixel with the accumulator color value.

55. The system of claim 45, wherein:
the tile subdividing means defines as a second tile a second area of overlap between a second set of at least two layers, the tile comprising a second sub-set of the image pixels;
the accumulating means initializes a second accumulator color value for at least one image pixel in the second defined tile;
the layer selecting means successively selects each of at least a subset of the layers in the second set of at least two layers, each selected layer having a layer pixel corresponding to the image pixel, the layer pixel having a color value;
the compositing means, for each successively selected layer, composites the color value of the layer pixel with the second accumulator color value and stores the result in the accumulating means; and
the output means outputs the second accumulator color value.

56. The system of claim 43, wherein each layer comprises a window, and wherein the image comprises a display for a windowing system.

* * * * *

UNITED STATES PATENT AND TRADEMARK OFFICE
CERTIFICATE OF CORRECTION

PATENT NO. : 7,330,192 B2
APPLICATION NO. : 11/503394
DATED : February 12, 2008
INVENTOR(S) : Ralph T. Brunner and Peter Graffagnino Page 1 of 1

It is certified that error appears in the above-identified patent and that said Letters Patent is hereby corrected as shown below:

Column 13, line 37, delete "re-sult" and replace with --result--

Column 15, line 56 delete "comprise"

Signed and Sealed this

Tenth Day of June, 2008

JON W. DUDAS
*Director of the United States Patent and Trademark Office*